Patented Nov. 25, 1930

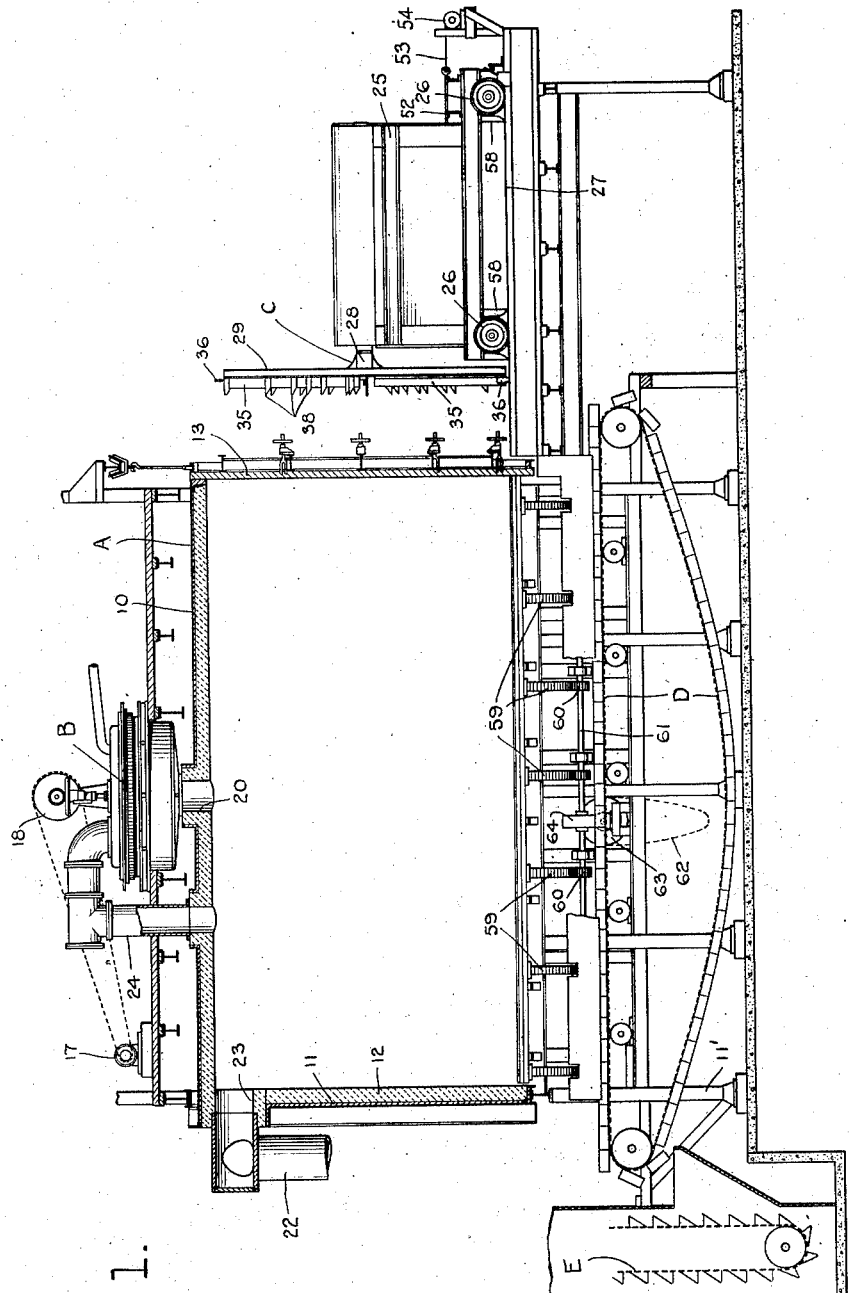

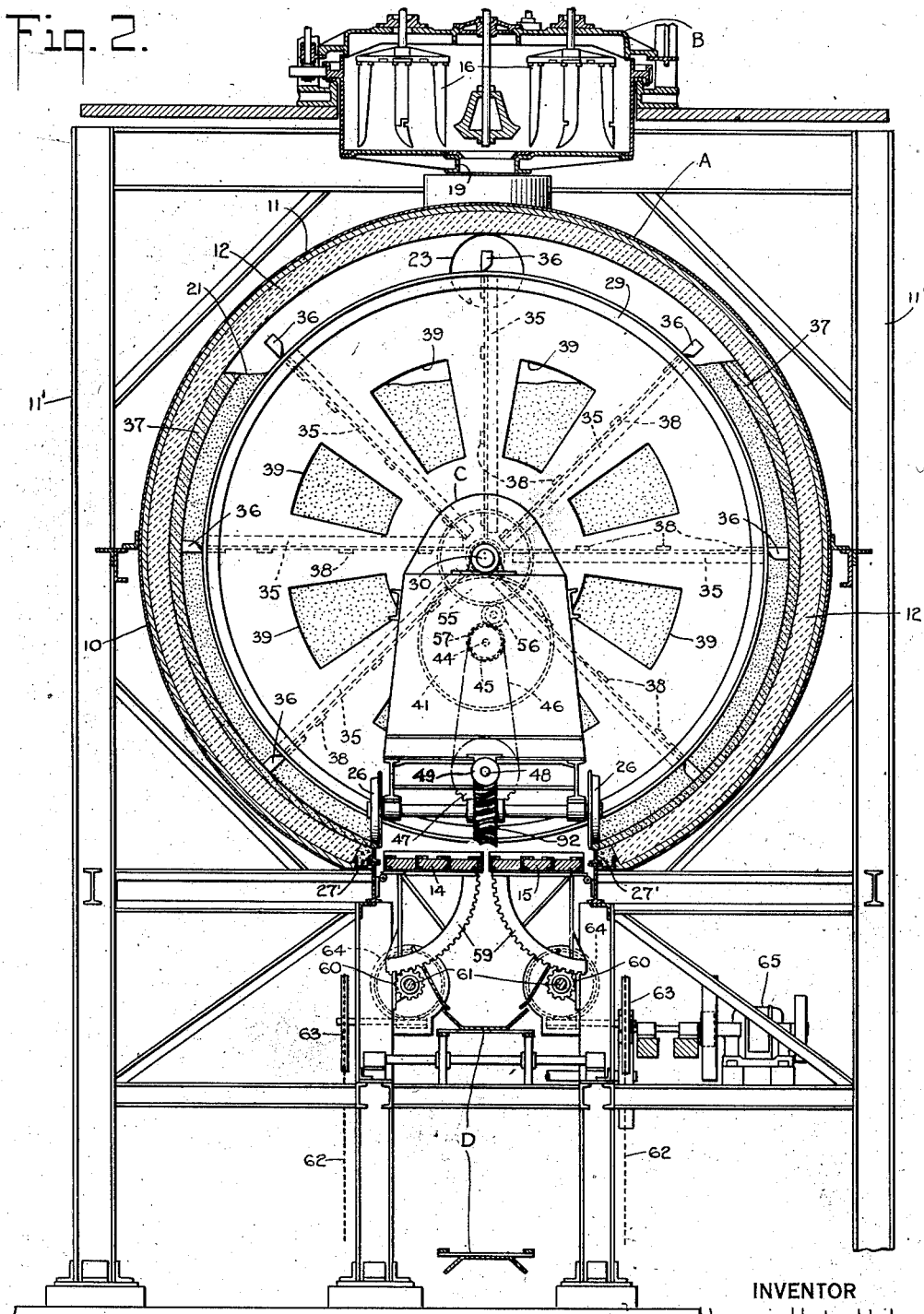

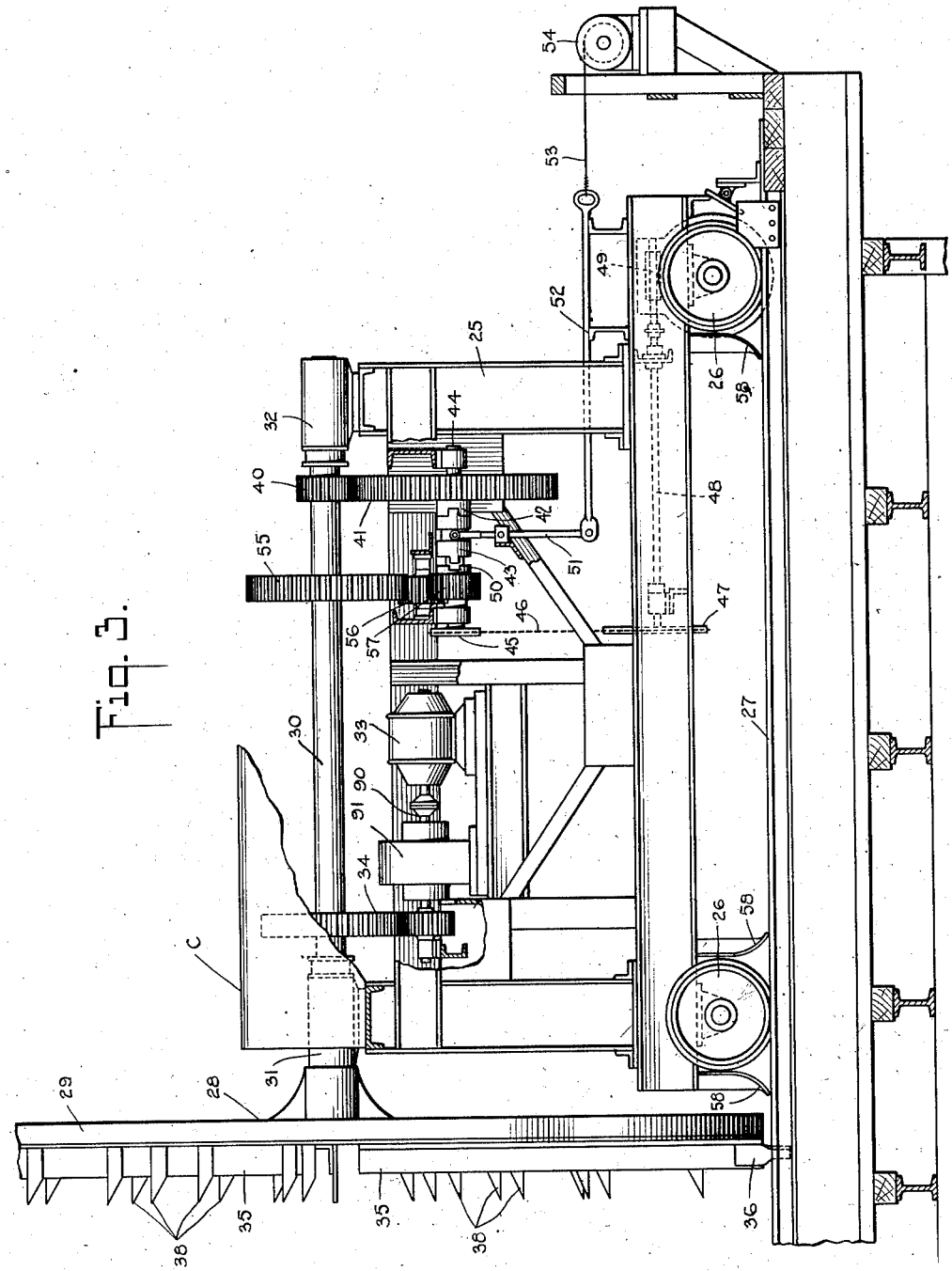

1,782,821

UNITED STATES PATENT OFFICE

INGENUIN HECHENBLEIKNER, OF CHARLOTTE, NORTH CAROLINA, ASSIGNOR, BY MESNE ASSIGNMENTS, TO CHEMICAL CONSTRUCTION CORPORATION, A CORPORATION OF DELAWARE

ACID-PHOSPHATE PLANT

Application filed April 14, 1927. Serial No. 183,687.

This invention relates to apparatus for comminuting or excavating materials, and relates more particularly to an acid phosphate plant; and has special reference to the provision of a combined excavator and den used in the manufacture of acid phosphate.

As is well known, acid phosphate is made by causing the inter-action of sulphuric acid with phosphate rock. In the manufacture of acid phosphate, the acid and phosphate rock are first intermixed and then fed into a large chamber or compartment, generally referred to in the art as the phosphate den, where the acid and phosphate ingredients are permitted to interact for a predetermined period of time, producing as a resultant product a mass of solid rock which is subsequently comminuted by excavating or comminuting apparatus.

A principal object of my present invention comprehends the provision of an improved apparatus or plant for producing acid phosphate, the improvements being directed in part to the construction of the den or acid phosphate containing chamber and in part to the construction of the excavator for comminuting the acid phosphate rock produced and to the combination and cooperative relation therebetween.

In manufacturing or producing acid phosphate on a large commercial scale, a number of problems are presented which require effective solution where efficient and economical manufacture are desired. The comparatively large size of a commercial plant, combined with the time necessarily consumed for the inter-reaction and setting of the ingredients of each acid phosphate charge, necessitate the provision of apparatus in which the parts are efficiently organized to permit continuity of operation and to inhibit or minimize time delaying breakdowns. The plant size and time consumption involved may be appreciated when it is understood that the capacity of the den or charge container may be about 150 tons, and that the time consumed for the inter-reaction and setting of the ingredients prior to the comminuting or excavating step may be from 10 to 24 hours.

To practice the method on a large scale in an economical way, my present invention centers about the provision of an improved acid phosphate den constructed and designed to permit the mixing and interreacting of the ingredients efficiently and expeditiously, and the provision of an excavating apparatus employed therewith and constructed and designed to operate upon the phosphate charge in a positive manner to effect the comminution of the charge to a fine pulverized state in a uniform and clogless manner, the charge being so acted upon and the comminuted material so handled as to permit the removal of the pulverized material from the den and the conveying of the same to other parts of the plant with facility and convenience.

More specific objects of my invention comprise the provision of an excavating apparatus embodying a rotary cutting means designed to cause a draft or circulation of air into the den or chamber to prevent the escape of any phosphate dust and to so control the handling of the phosphate dust as to permit the ready removal of the same from the den, and functioning also to produce a drying of the phosphate material as well as a cooling of the same and of the cutting apparatus; the still further provision of a phosphate den constructed and designed to cooperate with the excavating apparatus to induce or promote said draft or air circulation; the still further provision of a phosphate den combined with a feed mixer therefor constructed and designed so that a ready escape is provided for the fumes generated both in the mixer and in the phosphate den; the still further provision of an excavating apparatus having a cutting means which produces a cavity in the phosphate rock of a size to permit the uninterrupted and efficient forward movement of the excavating apparatus into the den; and the still further provision of an acid phosphate plant in general designed to effectively handle large capacity charges of material.

To the accomplishment of the foregoing and such other objects as will hereinafter appear, my invention consists in the elements and their relation one to the other as hereinafter more particularly described and sought to be defined in the claims; reference being had to the accompanying drawings which show the preferred embodiment of my invention, and in which:

Fig. 1 is a longitudinal elevational view, partly in section, of the apparatus embodying my invention, Fig. 2 is a transverse elevational sectional view of the same drawn to an enlarged scale and showing the excavator within the phosphate den, and Fig. 3 is a side elevational view with parts broken away of the excavating apparatus.

Referring now more in detail to the drawings, the plant embodying my invention is shown to comprise a den generally designated as A, into which a charge of sulphuric acid and phosphate rock is adapted to be fed from the mixing apparatus B, the ingredients of which charge inter-react and set into a solid mass which is adapted to be broken by or comminuted by the excavating apparatus, generally designated as C, to produce a finely pulverized material which is discharged onto a conveyor generally designated as D, which latter conveys the comminuted material to an elevator or other apparatus E for further disposal.

The den A comprises an elongated horizontally disposed chamber which may have a capacity of about 150 tons and which chamber is preferably cylindrical, as illustrated in Fig. 1 of the drawings, said den comprising an external steel shell 10 supported on a steel or other framework structure 11' made of inter-connected I beams or the like, the interior of the shell 10 being provided with a facing of mortar 11 having a superposed lining 12 made of chemical brick laid in Portland cement. The den chamber is open at one end, which end is provided with a slidable door 13 which is clamped and sealed against the open end of the den prior to the introduction of the acid phosphate mixture, the said door being moved to open position when the acid phosphate charge is ready for treatment and removal. The bottom of the acid den is also provided with an opening extending the length of the den, which opening is normally closed by two pivoted doors 14 and 15, as shown in Fig. 2 of the drawings, which doors are opened when the acid phosphate charge is being ground.

The mixing apparatus B may be of any well-known construction provided with the mixers 16, 16 rotated by means of a motor 17 and motion communicating mechanism 18. The feed mixer B has an open bottom 19 which communicates with the feed or charging opening 20 of the den A. As will be understood, the acid and phosphate rock ingredients are first automatically weighed out and conveyed to the mixer B (by apparatus not shown) where they are thoroughly mixed, the ingredients then automatically feeding into the chamber of the den A up to a level such as is indicated as 21 in Fig. 2 of the drawings. The charge thus introduced into the acid phosphate den is permitted to inter-react for an extended period of time and to set in a solid state.

For readily permitting the escape of the gases or fumes generated in the den A during the reacting period of the charge, there is provided a flue 22 which communicates with the interior of the den chamber at a point above the level 21 of the charge therein; and in the preferred construction this flue communicates with an opening 23 provided at the upper part of the chamber at an end of the den opposite the door or closure end 13. Preferably for economy of construction and for permitting more efficient operation of both the mixing apparatus and the den, the mixer B is provided with a conduit 24 connecting the top of the mixer B with the top of the den chamber A, so that the flue 22 is effective for drawing off the gases or fumes in both the mixer B and the den A. The flue 22, due to its position and the arrangement shown, also performs another function in conjunction with the excavator C, as will be described more in detail hereinafter.

The excavator C comprises a carriage 25 provided with traction wheels 26, 26 movable on rails 27, 27, the said rails having extensions 27', 27' located in the den A, the said excavator further including a rotary cutting apparatus 28 mounted on so as to be movable longitudinally with the carriage 25, which cutting mechanism is journalled for rotation on the carriage 25.

The rotary cutting mechanism 28 comprises in its more specific construction a disc 29 fixedly mounted on a shaft 30 suitably journalled in the boxes 31 and 32, which shaft is driven by a motor 33 carried by the carriage 25, the shaft being connected to the motor by means of motion reducing gearing 34 and motor shaft 90, said motor shaft being supported in the bearing element 91. The inner or operating face of the disc 29 carries a series of blades 35, 35 disposed radially thereon, as is most clearly seen in Figs. 2 and 3 of the drawings. Each of the blades 35 carries a plow 36 which projects beyond the periphery of the disc 29, these plows serving to form a cavity of greater dimensions than the dimension of the disc 29, as is clearly illustrated in Fig. 2 of the drawings. The ends of the plows, however, are spaced a short distance from the inner surface of the lining 12. leaving a layer 37 of unbroken or untreated material as a further protection to the lining 12. In addition to the plows 36, each blade 35 carries a series of spaced cutters 38, 38. Each series of cutters 38 is disposed in staggered relation to the other series, as best seen in Fig. 2 of the drawings, with the result that the material acted upon is reduced to a fine pulverized state by the operation of the rotary cutter 28.

I have found that by promoting a draft or circulation of air, particularly in or about the region where the phosphate rock is being comminuted, I am enabled to efficiently handle the charge being treated as well as the comminuted material. To accomplish this result, the disc 29 is provided with a series of circumferentially disposed openings 39 preferably arranged in the spaces between the blades 35 (see Fig. 2). The rotation of the disc 29 induces a draft or circulation of dry and cold air into the chamber through the openings 39 which aids in drying and cooling the material being ground and in cooling the cutting edges of the cutting apparatus. The suction or circulation of air is due in part to the rotation of the disc, in part to the action of the blades 35, and in part to the suction of the flue 22. Preferably the blades 35 support the cutters 38 so that the blades serve the double function of cooperativley causing the suction or circulation of air to take place and of supporting the individual cutters 38.

With the provision of the cutting apparatus thus far described, I have found that I am enabled to continue the cutting operation for the whole charge in the den without interruption or breakdown, all of the working parts as well as the material acted upon being kept in a relatively cool and working condition. I have also found that the ground material gravitates in a clogless manner to the bottom opening of the den for efficient discharge through the floor of the den into the conveying apparatus D, this being caused by the air circulation and by the action of the rotary blades 35. The operation of the extension plows 36 is such as to permit forward propulsion movement of the disk 29 within vibration limits, this also aiding in inhibiting any stoppage of the apparatus.

For propelling the carriage 25 and the cutter 28 thereon forwardly into and out of the den A, I provide gearing mechanism connecting the drive shaft 30 with the rear traction wheels 26, said gearing including in the preferred construction a reversible clutch means designed to permit slow advancing movement but more rapid retreating movement of the carriage. Referring to Fig. 3 of the drawings, I show such gearing mechanism to comprise a pinion 40 fixed to the shaft 30 meshing with a gear 41 fixed to a clutch element 42 which is shown coupled to the movable clutch element 43, the latter being keyed to a shaft 44, at the end of which is mounted a sprocket gear 45 connected by a chain 46 to a sprocket gear 47 fixed in turn to a shaft 48 having a worm gear 49 in mesh with a worm wheel 92 (Fig. 2) fixed to the traction wheel 26. With this construction it will be seen that the operation of the motor 33 causes the rotation of the rear traction wheels 26 to propel the carriage 25 forwardly with a slow motion, this propulsion taking place simultaneously with the rotation of the rotary cutting means 28.

For automatically effecting the retarding or withdrawing movement of the cutting mechanism and carriage after a charge has been treated, I provide means for moving the clutch member 43 into engagement with a complemental clutch element 50 which connects the shaft 30 to the traction wheels to reverse the direction of operation of the same. To this end the clutch member 43 is provided with a shift lever 51, the lower end of which is connected to a pull bar 52, which pull bar is connected to a cord or chain 53 unwinding from a reel 54. When the reel 54 is completely unwound, the shift lever 51 is actuated to couple clutch member 43 to the clutch element 50; and when this action takes place, motion increasing gearing connecting the shaft 30 with the sprocket gear 45 is connected to effect the retarding movement of the carriage. This motion increasing gearing comprises a large gear 55 fixed to the shaft 30 and meshing with an intermediate pinion 56, which in turn meshes with a pinion 57 connected to the clutch element 50. Preferably the traction wheels 26 are provided with track cleaners 58, 58.

In the preferred embodiment of the invention, the doors 14 and 15 of the den are opened and closed by motive power, said doors being each provided with a series of gear sectors 59, 59 which engage the series of pinions 60, 60 on the shafts 61, 61. The shafts 61, 61 are rotated to open or shut the doors 14 and 15 by means of manual or other power applied to the power chains 62 for rotating the sprocket wheel 63. The rotation of the sprocket wheel 63 is transmitted to the shafts 61 by the aid of worm and gear mechanism 64. The two doors 14 and 15 may thus be operated simultaneously or successively, as desired.

The conveyor D preferably comprises a pan conveyor of any type well known to the art which may be operated from the motor 65 shown in Fig. 2 of the drawings, and the said conveyor communicates with a discharge station shown in the form of an elevator mechanism E which elevates the material for further disposal.

The use and operation of the acid phosphate plant of my present invention and the many advantages thereof will in the main be fully apparent from the above detailed description thereof. It will be further apparent that while I have shown and described my invention in the preferred form, many changes and modifications may be made in the structure disclosed without departing from the spirit of the invention, defined in the following claims.

I claim:

1. In an excavator plant, a den for containing the material to be excavated, a rotary cutter movable into and from said den comprising a disc, blades mounted radially on the operating face of the disc, a plurality of series of cutters mounted on said disc, the cutters of each of the series being also mounted radially on the operating face of the disc and the cutters of one series being disposed in staggered relation to the cutters of the other series, at least one of said series being provided with a cutter projecting radially beyond the periphery of the disc.

2. In an excavator plant, a den for containing the material to be excavated, a carriage movable into and from said den, a rotary cutter mounted on said carriage and comprising a disc, blades mounted radially on the operating face of the disc, a plurality of series of cutters mounted on said disc, the cutters of each of the series being also mounted radially on the operating face of the disc and the cutters of one series being disposed in staggered relation to the cutters of the other series, at least one of said series being provided with a cutter projecting beyond the periphery of the disc, and a motor on said carriage for propelling said carriage forwardly and simultaneously actuating said rotary cutter.

3. In an excavator plant, a den for containing the material to be excavated, a carriage movable into and from said den, a rotary cutter mounted on said carriage and comprising a disc, blades mounted radially on the operating face of the disc, a plurality of series of cutters mounted on said disc, the cutters of each of the series being also mounted radially on the operating face of the disc and the cutters of one series being disposed in staggered relation to the cutters of the other series, and a motor on said carriage for propelling said carriage forwardly and for simultaneously actuating said rotary cutter.

4. In a phosphate excavator plant, a den for containing the material to be excavated, a rotary cutter movable into and from said den comprising a circular disc, blades mounted radially on the operating face of the disc, a series of cutters mounted on each of said blades, the cutters of one series being disposed in staggered relation to the cutters of the other series and a cutter attached to the outer end of said blades and projecting radially beyond the circumference of the disc.

5. In an excavator plant, a den for containing the material to be excavated, a rotary cutter movable into and from said den comprising a disc, and a plurality of cutters mounted on the operative face of the disc, the disc having openings disposed therein whereby the rotation of the disc causes a suction of air from the outer face of the disc towards the operating face thereof.

6. In a phosphate excavator plant, a den for holding the phosphate material to be excavated, a carriage movable into and from said den, a rotary cutter mounted on said carriage and comprising a disc, and a plurality of cutters mounted in relation to said disc, the disc having a series of openings disposed circumferentially therein whereby the rotation of the disc causes a suction of air from the outer face of the disc through said openings towards the cutters mounted in relation thereto, and a motor on said carriage for propelling said carriage forwardly and simultaneously actuating the rotary cutter.

7. In a phosphate excavator plant, a den for containing the material to be excavated, rotary cutting means movable into and from said den comprising a rotatable disc, a plurality of cutters mounted on and projecting perpendicularly from the operating face of the disc, and a series of cutters projecting radially from said disc, each of the cutters of said last mentioned series having a cutting face parallel to the axis of rotation of the disc, whereby a cavity of greater diameter than the diameter of the disc is formed upon rotation of said cutter.

8. In combination, a den comprising a chamber for holding a charge to be comminuted, a flue communicating with the interior of the chamber above the level of the charge therein, and rotary cutting means comprising a rotary disc having a plurality of cutters disposed on the operating face thereof, said disc having a plurality of openings therein whereby a circulation of air from the outer face of the disc through said openings and to said flue is promoted during the operation of said cutting means.

9. In combination, a den comprising a chamber for holding a charge to be comminuted, a flue communicating with the interior of the chamber above the level of the charge therein, a carriage movable into and out of said den, rotary cutting means mounted on said carriage comprising a rotary disc having a plurality of cutters disposed in relation thereto, said disc having a plurality of openings therein whereby a circulation of air from the outer face of the disc through said openings and to said flue is promoted during the operation of said cutting means, and a motor on said carriage for propelling the carriage forwardly and simultaneously actuating said rotary cutting means.

10. In combination, a den comprising a horizontally disposed chamber for holding a charge to be comminuted, said chamber being open at one end and provided at the other end with a flue communicating with the interior of the chamber above the level of the charge therein, and rotary cutting means movable into said chamber at the open end thereof and comprising a rotary disc having a plurality of cutters disposed on the operating face thereof, said disc having a plurality of openings therein whereby a circulation of air from the outer face of the disc through said openings and to said flue is promoted during the operation of said cutting means.

11. In combination, a den comprising a chamber for holding a charge to be comminuted, a feed mixer mounted over said chamber and communicating therewith, a flue communicating with the interior of the chamber above the level of the charge therein, rotary cutting means comprising a rotary disc having a plurality of cutters disposed on the operating face thereof, said disc having a plurality of openings therein whereby a circulation of air from the outer face of the disc through said openings and to said flue is promoted during the operation of said cutting means, and a conduit connecting said feed mixer with said chamber to connect said mixer with said flue.

12. In combination, a den comprising a chamber for holding a charge to be comminuted, a flue communicating with the interior of the chamber above the level of the charge therein, rotary cutting means comprising a rotary disc having a plurality of cutters disposed on the operating face thereof, said disc having a plurality of openings therein and a plurality of blades mounted radially thereof and between said openings whereby a circulation of air from the outer face of the disc through said openings and to said flue is promoted during the operation of said cutting means.

13. A phosphate den comprising a horizontally disposed chamber for holding a charge to be comminuted, a flue communicating with the interior of the chamber above the level of the charge therein, a feed mixer mounted on the top of the chamber and communicating therewith, and a passage connecting the top of the mixer with the top of the chamber whereby said flue serves as an exhaust flue for both said den and mixer.

14. In combination, a phosphate den comprising a horizontally disposed chamber for holding a charge to be comminuted, said chamber being open at one end and being provided at the other end with a flue communicating with the interior of the chamber above the level of the charge therein, a feed mixer mounted on the top of the chamber and communicating therewith, a passage connecting the top of the mixer with the top of the chamber whereby said flue serves as an exhaust flue for both said den and mixer, and a rotary cutter movable into and out of said den at the open end thereof.

15. A phosphate den comprising a horizontally disposed chamber for holding a charge to be comminuted, said chamber having an outer steel shell faced with a layer of mortar and a superposed layer of chemical brick, and a rotary cutting means movable into and from the den for comminuting the charge therein, said rotary cutting means including a disc and cutters projecting radially beyond the periphery of the disc to produce a cavity having a diameter greater than that of the disc but less than the inner diameter of said brick facing.

16. A phosphate den comprising a horizontally disposed chamber for holding a charge to be comminuted, said chamber having an outer steel shell faced with a layer of mortar and a superposed layer of chemical brick, a flue communicating with the interior of the chamber above the level of the charge therein, a feed mixer mounted on the top of the chamber and communicating therewith, and a passage connecting the top of the mixer with the top of the chamber whereby said flue serves as an exhaust flue for both said den and mixer.

Signed at New York city, in the county of New York and State of New York this 11th day of April, A. D. 1927.

INGENUIN HECHENBLEIKNER.